United States Patent [19]

Bind

[11] 4,403,017
[45] Sep. 6, 1983

[54] LOW THERMAL EXPANSION MODIFIED CORDIERITES

[75] Inventor: Jean-Marie Bind, Ville d'Azray, France

[73] Assignee: The Perkin-Elmer Corporation, Norwalk, Conn.

[21] Appl. No.: 325,959

[22] Filed: Nov. 30, 1981

[51] Int. Cl.³ .................. B32B 9/04; B32B 17/00; B32B 13/04
[52] U.S. Cl. .................... 428/702; 428/446; 501/118; 501/119; 501/122
[58] Field of Search .............. 428/702, 426, 446; 501/9, 118, 119, 120, 121, 122

[56] References Cited

U.S. PATENT DOCUMENTS

| | | | |
|---|---|---|---|
| 3,531,307 | 9/1970 | Rubin et al. | 501/119 |
| 4,258,099 | 3/1981 | Narumiya | 501/118 |
| 4,307,198 | 12/1981 | Oda et al. | 501/119 |
| 4,316,965 | 2/1982 | Oda et al. | 501/119 |
| 4,385,129 | 5/1983 | Inoguchi et al. | 501/118 |

*Primary Examiner*—George F. Lesmes
*Assistant Examiner*—Beverly K. Johnson
*Attorney, Agent, or Firm*—S. A. Giarratana; E. T. Grimes; T. P. Murphy

[57] ABSTRACT

A modified cordierite ($2MgO.2Al_2O_3.5SiO_2$) composition in which at least a portion of the silicon dioxide is replaced with germanium oxide. These compositions have low thermal expansion, excellent formability and thermal shock resistance making them especially suitable for the manufacture of mirror substrates to be used at elevated temperatures. By selecting the proportion of germanium oxide according to the intended operating temperature, substantially zero thermal expansion can be achieved between room temperature and the selected operating temperature. Methods of manufacturing the material and of selecting the thermal expansion characteristics are also disclosed.

8 Claims, 2 Drawing Figures

LOW THERMAL EXPANSION MODIFIED CORDIERITES

BACKGROUND OF THE INVENTION

This invention relates in general to low thermal expansion materials and, more specifically, to low thermal expansion modified cordierite compositions especially useful in the manufacture of mirrors for high temperature applications.

Cordierite ($2MgO.2Al_2O_3.5SiO_2$) has long been known to possess a low coefficient of thermal expansion (CTE), together with excellent shock resistance. Generally used as a sintered polycrystalline ceramic material, cordierite has been used in cookware and dinnerware (as described in U.S. Pat. No. 3,967,971), automobile catalytic converter substrates (U.S. Pat. No. 4,033,779), gas turbine engine components (U.S. Pat. No. 4,063,955) and other similar applications. Various additives have been suggested to improve sinterability, density, shock resistance, etc. While cordierite has a sufficiently low CTE for usefulness in these applications, the remaining thermal expansion is still a significant detriment in other applications, such as mirror substrates for high temperature uses, such as in laser systems.

Mirrors for high temperature applications are often operated in a narrow elevated temperature range. It is very difficult to manufacture a mirror at essentially room temperature, designing the optical surface so as to have acceptable optical characteristics at the higher intended operating temperature by compensating in the design for the effects of thermal expansion between the temperature at which the mirror surface is shaped and the temperature at which it is to be used. This compensation is extremely difficult with materials such as pure cordierite, which expand differently in different directions along the crystal structure.

Relatively pure cordierite is a crystalline material having relatively high refractoriness, a melting point of about 1460° C. and a CTE over the range up to about 1000° C. of about $16 \times 10^{-7}$ C. However, the sinterability of glass powders having the stochiometry of pure corderite is poor, often resulting in porous, granular, mechanically-weak bodies when sintered at temperatures up to about 1200° C. Sintering at higher temperatures causes melting and the formation of a second phase (which may be mullite, spinel, corundum, saphirine, or a combination of them in varying proportions). This uncongruent melting behavior constitutes a serious problem in the sintering of cordierite since the presence of a second phase, even in small amounts, has deleterious effects on thermal expansion. Similarly, attempts to improve sinterability or other characteristics of cordierite by adding other agents (or, simply, the use of impure raw materials) have been found to generally adversely affect thermal expansion characteristics, as described, for example, in U.S. Pat. No. 3,885,977.

Therefore, there is a continuing need for improved materials having lower thermal expansion between room and high operating temperatures while retaining the necessary sinterability, shock resistance, strength, etc., and for improvements in methods of fabricating articles from these materials.

OBJECTS OF THE INVENTION

It is, therefore, an object of this invention to provide a modified cordierite composition overcoming the above-noted problems.

Another object of this invention is to provide modified cordierite compositions having improved thermal expansion characteristics.

Another object of this invention is to provide a method of sintering cordierite compositions at lower temperatures to produce improved articles.

A further object of this invention is to provide a method of selectively modifying cordierite compositions to provide substantially zero thermal expansion between room temperature and a selected operating temperature.

Yet another object of this invention is to provide sintered articles of modified cordierite compositions having improved density and uniformity.

SUMMARY OF THE INVENTION

The above objects, and others, are accomplished in accordance with this invention by a modified cordierite composition having germanium oxide in place of a portion of the corresponding molecular amounts of silicon dioxide. The composition of the modified cordierite may be represented as $2MgO_2.2Al_2O_3.5-xSiO_2.xGeO_2$, where "x" represents moles of germanium dioxide.

Pure cordierite expands continuously as temperature increases from room temperature. I have found that substitutions of germanium oxide in place of silicon dioxide dramatically alters the thermal expansion of cordierite. As temperature is raised, these novel modified cordierite compositions start contracting, then begin expanding. This phenomenon offers great advantages in the design and manufacture of ceramic mirror substrates or the like since it becomes possible to tailor the amount of germanium oxide used to bring the thermal expansion zero cross-over temperature to coincide with the intended operating temperature. In this case, the dimensions of the mirror will be identical to those at which it was polished. I have also found that low levels of germanium oxide improve the low temperature thermal expansion and contraction characteristics of cordierite, typically between about $+100°$ C. and $-170°$ C. Desirable low temperature CTE and sintering improvements are obtained with from about 0.1 to 3 moles germanium oxide in place of the corresponding proportion of silicon dioxide.

My method of fabricating objects of modified cordierite basically consists of the steps of providing the necessary pure metallic salts in the selected proportions, grinding (as in a ball mill) the mixture for a suitable period, pressing the powder mixtures into the desired shapes and sintering the shapes to produce the desired products. As is detailed below, much improved sinterability, density and uniformity also result from the addition of germaninum oxide and from performing the several method steps within specific parameter ranges.

BRIEF DESCRIPTION OF THE DRAWING

Details of the invention, and of certain preferred embodiments thereof will be further understood upon reference to the drawing wherein.

DETAILED DESCRIPTION OF THE INVENTION

Figure 1:
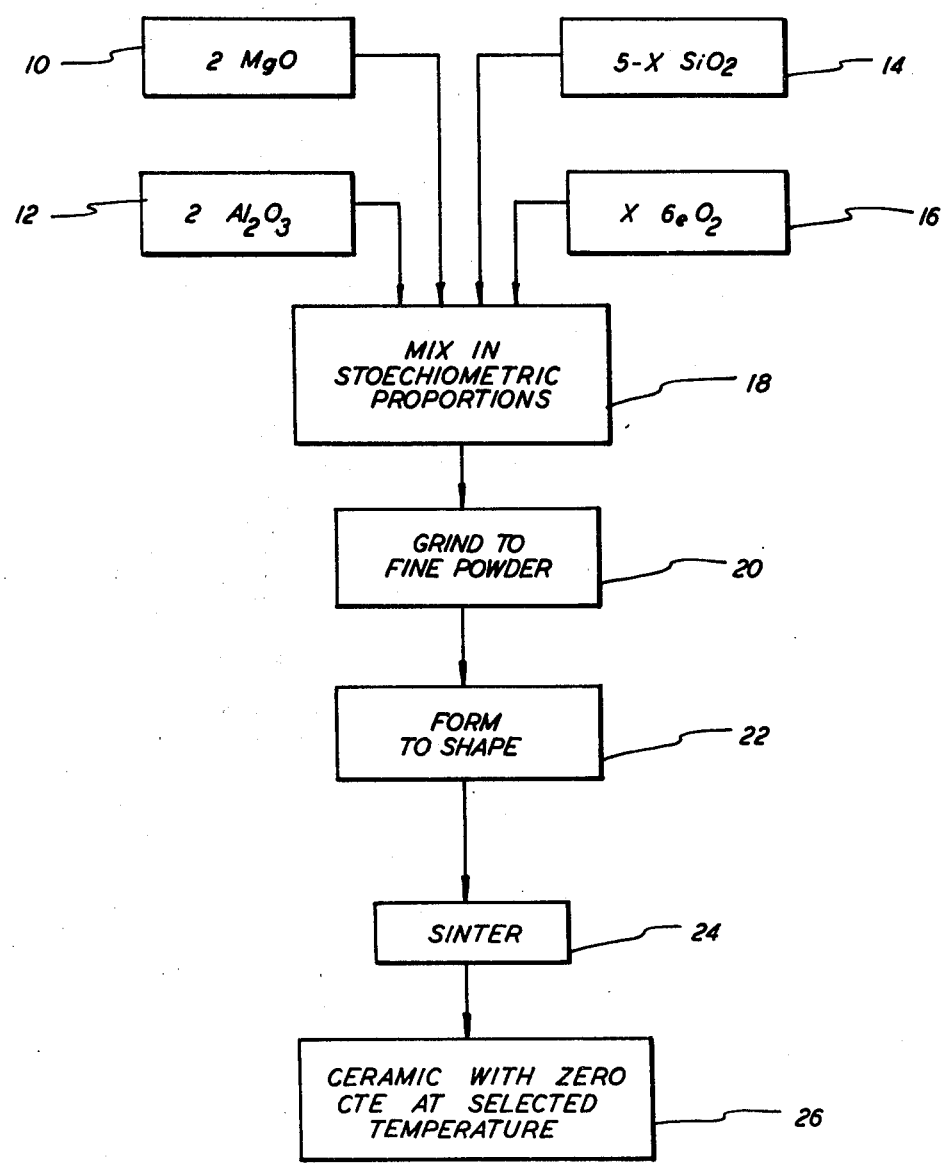
FIG. 1 is a flow sheet illustrating the process for preparing the modified cordierite ceramics of this invention.

Referring now to FIG. 1, there is seen a flow sheet showing the process for preparing a modified cordierite ceramic having a substantially zero coefficient of thermal expansion between room temperature (about 20°–25° C.) and a selected second temperature.

The first step is to obtain or prepare the four required metal salts in the proper stoichiometric quantities. For pure cordierite, the proportions are 2 moles magnesium oxide (box 10), 2 moles aluminum oxide (box 12), and 5 moles silicon dioxide (box 14). For the modified cordierite of this invention, germanium oxide (box 16) is substituted for part of the silicon dioxide on a molecular basis.

As is detailed below, the modified cordierite ceramic contracts when first heated, then expands as temperature continues to increase, with the zero cross-over point depending upon the proportion of germanium oxide. Thus, when one knows the intended operating temperature of the structure to be fabricated, the amount of germanium oxide is selected accordingly, based on tests with samples having varying germanium oxide proportions.

The raw materials should be in the form of reasonably pure oxides since some impurities tend to cause the formation of a second phase during sintering, adversely affecting thermal expansion characteristics and other physical characteristics. For best results, the starting materials should have purities of at least about 97% (after heating to remove volatiles) although this may vary depending upon the type of impurity.

The raw materials are mixed together (box 18) in stoichiometric proportions so as to give the following reaction during sintering (for pure cordierite): $2MgO + 2Al_2O_3 + 5SiO_2 \rightarrow Mg_2Al_2Si_{15}O_{18}$. For my modified cordierite material, germanium oxide is substituted for at least a portion of the silicon dioxide on a mole-for-mole basis, as indicated by the "5−x" and "x" in boxes 14 and 16, respectively, to produce a corresponding reaction during sintering.

After rough mixing, the mixture is ground (box 20) to produce a fine, uniform powder. While any suitable grinding method may be used, ball milling is preferred for convenience and reliability. Preferrably, an anti-coagulation agent, such as acetone, is included to prevent coagulation and gelification of the very fine powders used as raw materials. Any suitable mix of grinding balls, powder mixture and anti-coagulant may be used, such as ⅓ powder mixture, ⅓ grinding balls and ⅓ acetone. After grinding for an appropriate period, usually for at least about 12 hours, the resulting slurry is removed, dried and the soft agglomerantes produced are forced through a fine mesh screen to homogenize the particle size.

The material is then formed into the desired article shape (box 22). Typically, the material may be formed in a hydraulic press at about 10,000 to 50,000 psi. If desired, an organic binder, such as 1 to 2 percent of a 15 percent aqueous polyvinyl acetate solution may be used to improve pressing uniformity. The binder is, of course, eliminated early in the sintering heating cycle. Other processes, such as slip casting, hot-pressing, etc., will often be preferred in production operations for faster throughput and lower shrinkage. The resulting self-sustaining pressed structure is sintered (box 24) to produce the desired polycrystalline ceramic. The structure may be sintered at any suitable temperature for any suitable time period. Typically, the structure may be sintered in a Lindberg box type furnace heated with silicon carbide elements. Disc shaped structures may be supported on zirconia setters and covered with alumina dishes to prevent contamination.

Generally, depending uon the proportion of germanium oxide included, maximum sintering temperatures in the 1250° C. to 1400° C. range are preferred for optimum density without the formation of an undesireable second phase. I have found that the addition of germanium oxide lowers the optimum sintering temperature from the about 1400° C. for pure cordierite to about 1250° C. for samples containing germanium oxide towards the higher end of the preferred range described above. The lower sintering temperature possible with the germanium oxide is also beneficial in minimizing the various interactions between the mold surfaces and the structure in hot-pressing operations.

I have found that increasing the temperature rapidly to the sintering temperature produces a structure having a glazed and shiny surface and poorer properties. Since germanium oxide melts at about 1100° C., apparently with rapid temperature increases the germanium oxide melts and the liquid diffuses and boils out at the structure surface. For best results, the sintering should be accomplished by heating the structure from room temperature to about 1000°–1100° C. over from about 10 to 30 hours, with optimum results at about 20 hours, then heating the structure to the final sintering temperature (from about 1250° to 1400° C., depending on germanium oxide content, as discussed above) over from about 2 to 6 hours, the longer period being preferred for the higher sintering temperatures. The temperature may be either increased stepwise or gradually and steadily, as desired.

The structures are cooled from the sintering temperature to room temperature over a reasonable time period to avoid thermal shocks. Simply turning the furnace off and allowing it to cool naturally is often convenient. After cooling the structure, it is removed from the furnace and examined (box 26). It is found to have excellent physical properties, a uniform high density and a zero CTE between room temperature and a selected higher temperature, depending on germanium oxide content.

The method of determining the proportion of germanium oxide to use to obtain the desired zero cross-over point is further detailed in the following examples, which set forth preferred embodiments of the method of this invention. All parts and percentages are by weight unless otherwise indicated.

EXAMPLE I

A sample of pure cordierite ($2mgO.2Al_2O_3.5SiO_2$) was prepared as a standard for comparison with the modified cordierite compositions. In order to assure comparability, process variables are maintained constant throughout this and the subsequent examples.

A mixture was prepared consisting of 2 moles magnesium oxide (Baker Reagent grade), 2 moles alumina (a fine reactive alumina produced by flame hydrolysis of anhydrous aluminum chloride from the Degussa Co.) and 5 moles silica (available under the trademark Aerosil from the Degussa Co.). While not used in this example, germanium oxide of high purity is available from Eagle Pitcher Industries.

In order to assure precise stoechiometry, each of these materials was heated to about 1000° C. for about 15 hours and ignition weight losses were determined to be about 8.24 wt.% for the magnesium oxide, about 6.06 wt.% for the aluminum oxide, about 2.93 wt% for the silicon dioxide and essentially zero for the germanium oxide. Correcting for ignition losses, the above-stated stoechiometric mixture was obtained by mixing 3.003 g. magnesium oxide, 7.422 g. aluminum oxide, and 10.581 g. silicon dioxide.

The stoechiometric cordierite mixture was then placed in a ball mill with about ⅓ powder mixture, ⅓ alumina grinding balls and ⅓ acetone. Acetone was used as the milling fluid since finely divided aluminum oxide and silicon dioxide tend to coagulate and form a thick gel in the presence of water. The mixture is then homogenized by ball milling the powder for at least about 12 hours. The resulting slurry was dried in an oven to about 100° C. for 3 hours and the cake thus obtained was crushed and forced through a 325 mesh seive to homogenize the size of the soft agglomerates.

The mixture was then pressed into disks about 1.25 inch in diameter and about 0.25 inch in thickness, using tungsten carbide dies and rams and a semi-automatic Carver press. To improve pressing about 1% of a 15% polyvinyl acetate aqueous solution was added to the powder before pressing. The samples were pressed at a pressure of about 30,000 psi. Subsequent examination showed no gross pressing defects such as cracking or delamination.

The samples were sintered in a Lindberg box type furnace heated with silicon carbide elements. Temperature was precisely controlled with an RFL Industries, Boonton, N.J., Model 76 controller. Temperatures were measured with Pt/Pt90-Rh10 thermocouples placed in the immediate vicinity of the samples. The disks were placed on zirconia setters and were covered with alumina dishes to prevent contamination.

The pure cordierite samples were heated to about 1400° C. over about 6 hours, held at 1400° C. for about 4 hours, then the power was turned off and the samples were furnace cooled overnight.

The density of the sintered samples was found to be about 2.47 g/cm$^3$ (98% of theoretical). The high density appears to be attributable to the extreme fineness and reactivity of the starting powder and the careful control of stoechiometry exercised. Analysis by x-ray diffraction techniques using a Siemans diffractometer equipped with a diffraction beam monochrometer, scintillation detector and solid state electronics showed that the samples consisted of a single phase cordierite.

Thermal expansion characteristics were measured with a Perkin Elmer TMS-2 apparatus, using a rod of standard fused silica material (SMR-739) from the National Bureau of Standards as a calibration reference. A 0.25 inch cube was cut from a sample and baked at about 100° C. for about 2 hours to remove any residual moisture accumulated during the cutting operation. Thermal expansion measurements were then made at several temperatures between liquid hydrogen temperatures and 600° C. The results for the pure cordierite are plotted as line 30 in FIG. 2. The ratio of difference in length to the original length is plotted along the ordinate, with the temperature plotted along the abscissa.

Figure 2:
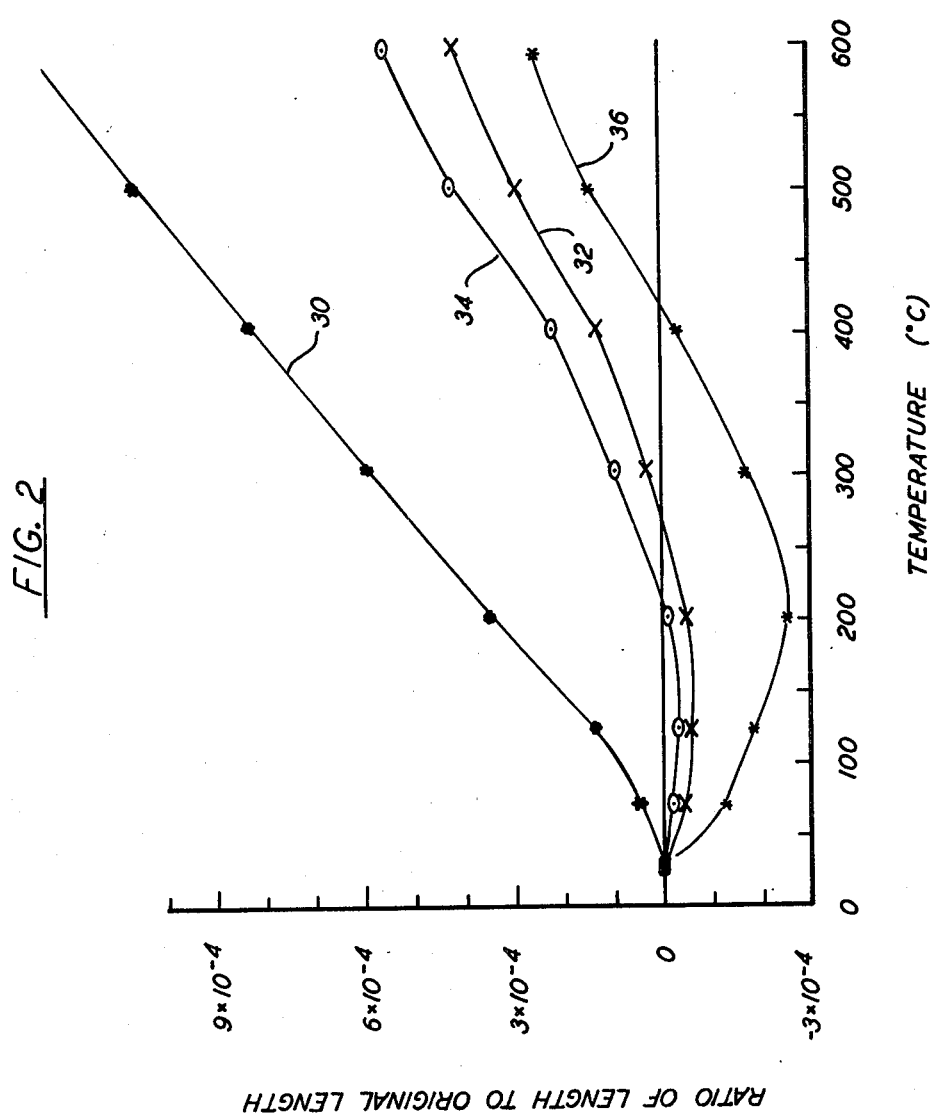
FIG. 2 is a plot of thermal expansion against temperature, illustrating the effect of varying proportions of germanium oxide in a modified cordierite ceramic.

As can be seen from line 30 in FIG. 2, pure cordierite has relatively low thermal expansion, but expansion steadily increases as temperature rises. The expansion characteristics of cordierite from −170° C. to 600° C. are further provided for comparison purposes in Table I, following these examples.

EXAMPLE II

The experiment of Example I was repeated, except that in this case the mixture contains, on a molecular basis $2MgO.2Al_2O_3.4.8SiO_2.0.2GeO_2$ and the sintering step is modified.

Since $GeO_2$ melts at about 1100° C., rapid heating during sintering was found to cause premature melting and diffusion of the germanium oxide. Therefore, the sintering was carried out by heating the sample to about 1000° C. over about 20 hours, then heating to about 1380° C. over about 4 hours, holding at 1380° C. for about 2 hours, then turning off the power and allowing the sample to furnace cool overnight.

A number of sintering operations were performed using the above composition, to maximum temperatures of from 1200° C. to 1450° C. Density and phase measurements showed that melting of the samples tended to occur at about 1410° C. and poor densification tended to occur below about 1370° C. The 0.2 mole $GeO_2$ was thus found to lower the optimum sintering temperature below the 1400° C. of pure cordierite.

After cooling, density and phase measurements as in Example I showed the sample to have a high density and a single phase. Thermal expansion characteristics were measured and tabulated in Table I. As can be seen, thermal expansion is much less than that of pure cordierite at cryogenic temperatures and somewhat less at low temperatures (below about 100° C.), but was substantially equal to pure cordierite at higher temperatures. For clarity, this example was not plotted in FIG. 2.

EXAMPLE III

The steps (except for the sintering steps) of Example I were repeated using a mixture having the following molecular composition: $2MgO.2Al_2O_3.4.6SiO_2.0.4GeO_2$.

Sintering tests showed that the best combination of density and single phase characteristics were obtained at a maximum temperature of about 1350°–1370° C. To avoid premature melting of the germanium oxide component, the sample was heated to about 1100° C. over about 21 hours, then the temperature was increased to about 1350° C. over about 3 hours, held there for about 3 hours then the sample was cooled by turning off the power and allowing the furnace to cool to nearly room temperature.

After cooling, analysis showed the sample to be a single phase polycrystalline ceramic and to have excellent density. The thermal expansion characteristics of the sample were measured and tabulated in Table I, below, and plotted in FIG. 2. As can be seen, the expansion characteristics are somewhat lower than pure cordierite above room temperature.

EXAMPLE IV

The steps of Example I were repeated, up to the sintering step, with a mixture having the molecular composition: $2MgO.2Al_2O_3.4.4SiO_2.0.6GeO_2$.

Sintering tests showed that an optimum combination of density and other properties is obtained where the highest sintering temperature is in the 1340°–1360° C. range. As described in Example II, to avoid premature GeO$_2$ melting, the sample was heated to about 1000° C. over about 18 hours, then the temperature was raised to about 1350° C. over about 3 hours. Cooling was accomplished by turning off the power and leaving the sample in the furnace about 10 hours.

The resulting sample was found to be a single phase ceramic and to have excellent physical properties. The expansion characteristics were measured and were tabulted in Table I and plotted in FIG. 2. While this higher proportion of GeO$_2$ produces poorer expansion characteristics at cryogenic temperatures, as shown in Table I, above room temperature the material initially contracts, then expands, with a point of zero expansion relative to room temperature between 200° and 300° C., as indicated by line 32 in FIG. 2.

EXAMPLE V

A mixture having the following molecular chemistry was prepared: 2MgO.2Al$_2$O$_3$.4SiO$_2$.1GeO$_2$. This material was mixed, ground and pressed as described in Example I.

Sintering tests revealed that for highest density while retaining a single phase, the highest sintering temperature should be about 1340° to 1350° C. As before, the sample temperature was increased stepwise from about room temperature to about 1100° C. over about 20 hours, then to about 1340° C. over about 4 hours and held there for about 2 hours. The heater was then turned off and the furnace was allowed to cool for about 12 hours.

A disk having good density and physical characteristics resulted. The expansion characteristics were measured and tabulated in Table I and plotted in FIG. 2. As temperature increased the sample initially contracted, then expanded, with a zero cross-over point relative to room temperature at between 100° and 200° C., as indicated by line 34 in FIG. 2.

EXAMPLE VI

Samples were prepared, mixed, ball milled and pressed as in Example I with the following powder molecular composition: 2MgO.2Al$_2$O$_3$.3SiO$_2$.2GeO$_2$.

Sintering tests showed that for best density and single phase characteristics, a maximum sintering temperature of from 1280° to 1340° C. should be used. The sample was gradually heated from room temperature to about 900° C. over about 17 hours as in the earlier examples. Then the temperature was raised to about 1300° C. over about 4 hours and held there for about 2 hours. The power to the furnace was then turned off and the furnace was allowed to cool overnight.

The resulting sintered disk was found to have excellent density and other properties. The thermal expansion characteristics were measured and tabulated in Table I and plotted in FIG. 2 as line 36. As can be seen, while the cryogenic expansion properties are not as desirable as those of samples having less GeO$_2$, as the sample is heated above room temperature it contracts until about 200° C., then begins to expand, reaching zero expansion relative to room temperature between 400° and 500° C. Thus, this formulation would be excellent for structures to be operated in that high temperature range.

EXAMPLE VII

Another sample was prepared, having the molecular composition: 2MgO.2Al$_2$O$_3$.2SiO$_2$.3GeO$_2$. The powders were mixed, milled and pressed as in Example I. Sintering tests at different maximum temperatures showed that best results are obtained at about 1270° to 1290° C.

The sample was heated stepwise from room temperature to about 1100° C. over about 20 hours then heated to about 1280° C. over about 2 hours and held at 1280° C. for an additional 2 hours. After gradual cooling, the sample was found to have good density and physical appearance. Analysis with the Siemans diffractometer as described in Example I showed that the sample was not a single phase ceramic, but contained small amounts of a second phase. It appears that the large proportion of germanium oxide is no longer solluble in the cordierite system, since slow cooling does not retain the beryl structure of cordierite.

Thermal expansion characteristics of the sample were measured and tabulated in Table I. The high thermal expansion was not plotted in FIG. 2, since it is off the scale. The very high thermal expansion shows the absence of the cordierite structure.

The above examples illustrate the advantages of the use of reasonable proportions of germanium oxide in place of silicon dioxide, on a mole-for-mole basis, in controlling thermal expansion of cordierite over a wide range of temperatures. Adding increasing amounts of germanium oxide lowers the thermal expansion to the point where the articles first contract, then expand. As quantities of GeO$_2$ increase, this contract/expand characteristic lessens, until finally the GeO$_2$ is beyond the capability of the cordierite structure to accomodate it. By selecting the proper proportion of GeO$_2$, (preferrably from about 0.2 to 2 mole substitution), a substantially zero thermal expansion relative to room temperature can be obtained at any operating temperature up to over 400° C. as indicated by FIG. 2. Also, small amounts of GeO$_2$ reduces the thermal expansion differences between cryogenic and room temperatures, as seen in Table I, which follows, wherein temperature (°C.) is plotted against Example number.

TABLE I

|     | AVERAGE EXPANSION ($10^{-7}$) (Relative to Room Temperature) | | | | | | | |
| --- | --- | --- | --- | --- | --- | --- | --- | --- |
|     | −170 | 71 | 124 | 200 | 300 | 400 | 500 | 600 |
| I   | 4.8  | 13 | 14  | 20  | 21  | 22  | 23  | 23 |
| II  | −0.2 | 5.7 | 14 | 22  | 23  | 24  | 26  | 28 |
| III | 5.8  | 4.9 | 7.7 | 11 | 13  | 14  | 17  | 18 |
| IV  | 12   | −7.2 | −4.9 | −2.4 | 1.2 | 3.6 | 6.3 | — |
| V   | 6    | −3 | 0.6 | 5   | 9   | 11  | 15  | 16 |
| VI  | 17   | −21 | −22 | −13 | −6  | −1.8 | 0.6 | 3 |
| VII | 29   | 43 | 30  | 40  | 47  | 52  | 56  | 58 |

Certain specific method steps, temperatures and materials were detailed in the above description of preferred embodiments. These may ve varied, where suitable, with similar results. For example, hot pressing, slip casting, etc., may be used to form the structures in place of the described cold pressing. Also, under some circumstances, higher sintering temperatures for longer times, quenching, etc., may be used.

Other applications, variations and ramifications of this invention will occur to those skilled in the art upon reading this disclosure. These are intended to be included within the scope of this invention as defined in the appended claims.

I claim:

1. A polycrystalline sintered ceramic single phase structure having improved thermal expansion and sintering characteristics, having the cordierite structure and the composition, on a molecular basis of: about 2 moles magnesium oxide, about 2 moles aluminum oxide, and about 5 moles divided between silicon dioxide and germanium oxide.

2. The ceramic structure according to claim 1 wherein said composition contains about 5−x moles silicon dioxide and about x moles germanium oxide, and "x" is a positive number from about 0.1 to about 2.

3. The method of manufacturing ceramic single phase structures having improved thermal expansion and sintering characteristics which comprises the steps of:
providing, on a molecular basis, a mixture of about 2 moles magnesium oxide, about 2 moles aluminum oxide, and about 5 moles divided between silicon dioxide and germanium oxide;
milling said mixture until finely divided and thoroughly mixed;
forming said mixture into a desired shape;
gradually heating said shape to a temperature at which sintering occurs and a cordierite type structure is formed; and
gradually cooling said structure.

4. The method according to claim 3 wherein said mixture contains about 5−x moles silicon dioxide and about x moles germanium oxide, and "x" is a positive number from about 0.1 to about 2.

5. The method according to claim 3 wherein said shape is sintered by gradually heating said shape to about 1000°–1100° C. over about 10 to 30 hours, then heating the shape to the sintering temperature over an additional 2 to 6 hours.

6. The method according to claim 3 wherein said shape is sintered by gradually heating said shape to about 1100° C. over about 20 hours, then heating said shape to final sintering temperature of from about 1250° C. to 1400° C. over an additional about 2 to 6 hours.

7. The method according to claim 3 wherein said milling is accomplished by ball milling said mixture for at least about 12 hours and an anti-coagulation agent is added to the mixture prior to milling.

8. The method according to claim 3 wherein said shape is formed by pressing said mixture at a pressure of from about 10,000 to 50,000 psi.

* * * * *